(12) United States Patent
Aogaki et al.

(10) Patent No.: US 7,527,741 B2
(45) Date of Patent: May 5, 2009

(54) MICROREACTOR INCLUDING MAGNETIC BARRIER

(76) Inventors: Ryoichi Aogaki, 2-20-12-1304, Ryogoku 2-chome, Sumida-ku, Tokyo, 130-0026 (JP); Eiko Ito, 4-4-2, Morishita 4-chome, Koto-ku, Tokyo, 135-0004 (JP); Mikio Ogata, 11-41, Onogawa 11-chome, Tsukuba-shi, Ibaraki, 305-0053 (JP)

( * ) Notice: Subject to any disclaimer, the term of this patent is extended or adjusted under 35 U.S.C. 154(b) by 520 days.

(21) Appl. No.: 10/565,755

(22) PCT Filed: Nov. 4, 2003

(86) PCT No.: PCT/JP03/14054

§ 371 (c)(1),
(2), (4) Date: Feb. 27, 2006

(87) PCT Pub. No.: WO2005/009605

PCT Pub. Date: Feb. 3, 2005

(65) Prior Publication Data

US 2007/0104624 A1 May 10, 2007

(30) Foreign Application Priority Data

Jul. 24, 2003 (JP) .............................. 2003-302027

(51) Int. Cl.
- C03C 15/00 (2006.01)
- C03C 25/00 (2006.01)
- B01J 19/00 (2006.01)
- C09C 1/00 (2006.01)
- B81B 1/00 (2006.01)
- C23C 18/00 (2006.01)
- C23C 24/00 (2006.01)

(52) U.S. Cl. .............................. 216/22; 216/33; 216/37; 216/39; 422/129; 422/130; 422/150; 422/151; 422/152; 422/198

(58) Field of Classification Search ................. 422/130, 422/129, 198, 199, 232, 150, 151, 152; 423/447.2, 423/447.3; 216/22, 27, 37, 33, 39
See application file for complete search history.

(56) References Cited

U.S. PATENT DOCUMENTS

| | | | | |
|---|---|---|---|---|
| 3,002,847 A | * | 10/1961 | Shaffer et al. | 427/550 |
| 3,170,810 A | * | 2/1965 | Kagan | 427/598 |
| 3,676,337 A | * | 7/1972 | Kolm | 210/695 |
| 3,844,907 A | * | 10/1974 | Kitamoto et al. | 360/17 |
| 4,079,002 A | * | 3/1978 | Iannicelli | 210/695 |
| 4,359,379 A | * | 11/1982 | Ushio et al. | 208/120.01 |
| 4,842,707 A | * | 6/1989 | Kinoshita | 204/298.37 |
| 5,089,071 A | | 2/1992 | Tominaga et al. | |
| 5,102,520 A | * | 4/1992 | Behr et al. | 205/641 |
| 5,200,084 A | * | 4/1993 | Liberti et al. | 210/695 |
| 5,332,487 A | * | 7/1994 | Young et al. | 205/80 |
| 6,136,182 A | * | 10/2000 | Dolan et al. | 210/94 |
| 6,322,685 B1 | * | 11/2001 | Kang et al. | 205/143 |
| 6,409,072 B1 | | 6/2002 | Breuer et al. | |
| 7,016,560 B2 | | 3/2006 | Ticknor et al. | |
| 2002/0119486 A1 | | 8/2002 | Oberhardt | |
| 2002/0166760 A1 | * | 11/2002 | Prentiss et al. | 204/155 |
| 2003/0006140 A1 | | 1/2003 | Vacca et al. | |
| 2003/0012483 A1 | | 1/2003 | Ticknor et al. | |
| 2003/0118453 A1 | | 6/2003 | Fritsch et al. | |
| 2004/0018611 A1 | * | 1/2004 | Ward et al. | 435/287.2 |
| 2004/0157085 A1 | * | 8/2004 | Kondo et al. | 428/692 |
| 2006/0083473 A1 | | 4/2006 | Ticknor et al. | |

FOREIGN PATENT DOCUMENTS

| | | |
|---|---|---|
| EP | 1 314 472 | 5/2003 |
| JP | 9-287571 | 11/1997 |
| JP | 10-337173 | 12/1998 |
| JP | 2000-221251 | 8/2000 |
| JP | 2001-524019 | 11/2001 |
| JP | 2002-018271 | 1/2002 |
| JP | 2002-326963 | 11/2002 |
| JP | 2002-371954 | 12/2002 |

OTHER PUBLICATIONS

Journal of Synthetic Organic Chemistry, Japan, vol. 57, p. 805, 1999.
Wakabayashi, et al., Journal of The Surface Finishing Society of Japan, vol. 52, p. 494, 2001.

* cited by examiner

Primary Examiner—Walter D Griffin
Assistant Examiner—Huy-Tram Nguyen
(74) Attorney, Agent, or Firm—Jordan and Hamburg LLP

(57) ABSTRACT

Means for enabling plating on sites of complex configuration, etching for fine complex pattern, etc. through reduction of the viscosity resistance brought about by walls of fine liquid channel of microreactor. In particular, a microreactor comprising a liquid inlet, a fine liquid channel and a liquid discharge zone characterized in that the liquid channel is formed of a magnetic barrier of band ferromagnet so that a magnetic liquid introduced through the inlet undergoes at least one operation of chemical reaction, mixing, extraction and absorption in the liquid channel. Further, there is provided means for plating or etching performed by causing a plating solution or an etching solution to flow through the liquid channel.

10 Claims, 16 Drawing Sheets

41a
41b 41a
41b (a) Resist application (b) Exposure (c) Electroless plating after development (d) Elimination of resist (e) Thickening of circuit membrance by electroplating (f) Magnified view (a) Under mask method (b)

(c) Over mask method (d)

(e)

(a)

(b)

MICROREACTOR INCLUDING MAGNETIC BARRIER

1. FIELD OF THE INVENTION

The invention relates to a microreactor having liquid channels formed by magnetic barriers and its application such as plating, etching, etc., and especially relates to a microreactor with high reaction efficiency, which has low viscous resistance by walls and high mixing effect in spite of microscopic liquid channels. Furthermore, in the application, plating to microscopic and complicated places in shape and etching of microscopic and complex patterns, etc. can be obtained.

2. BACKGROUND OF THE INVENTION

Recently, reactors called microreactors which react a minimal sample of microliters (μL) level have been paid much attention. These are useful apparatuses when searching the optimal condition from many reaction conditions by using precious samples, e. g, in the case of biochemical reactions. In addition, testing with minute amounts of a sample has also an advantage that a reaction proceeds under a constant temperature condition since the surface area is overwhelmingly large, compared with the quantity of a sample. Furthermore, there is a case to have to test with minute amounts of sample due to problems on the safety of reaction such as some of radical reactions. From these requests, microreactors have been focused on as reaction apparatuses of a future type hereafter in fine chemicals (for example, Journal of Synthetic Organic Chemistry, Japan, vol 57, p 805, 1999, Japanese Patent Laid-Open No. Hei 10-337173, Japanese Patent Koho No. 2001-524019, Japanese Patent Laid-Open No. 2002-18271).

However, these conventional microreactors are made for passing reaction liquid through liquid channels formed by microscopic grooves of several micrometer (μm) to several millimeter (mm). It was difficult to pass liquids stably through microscopic liquid channels since viscous resistance by the friction of channel walls is large because surface area is large in comparison with the quantity of reaction liquids. In a case of viscous liquid, there was also a problem that reaction efficiency was low since reaction liquids of different kinds mutually flow in laminar mode and did not mix and stir with each other. In the conventional microreactors, it was difficult to remove gas, water, etc. evolving during reactions in microscopic grooves. In the conventional microreactors, solid substances, which were deposited by reactions or difference of solubility, prevented liquids in the microscopic liquid channels from streaming smoothly. Furthermore, in the conventional microreactor, there were many troubles about static electricity generated by liquid friction etc. when for using electrostatic forces; magnetic valves and electrodes were placed on channel walls.

Also, in case of microscopic plating to a place of a complex shape, conventionally it has taken a procedure to conduct resist treatment, water repellant finish and so on to the other portions, while leaving a microscopic and complex shape of an object to be plated. However, it was not only expensive to conduct these treatments and finish to a microscopic pattern, but also there were virtually difficult to conduct these treatments to a complex shape and that a narrow place.

Recently, it is significant development of integration in a electronics field, that is to say, in printed circuit boards to conduct wiring of the inside of LSI, wiring among packages of combined LSI and further wiring among LSI and packages, it is performed to pursue microscopic wiring technology to meet each technical requirements. These wiring technology in recent packages and printed boards are conducted by mainly combination of a photolithographic technology. The technology is to challenge a limitation of line width by conventional etching as microscopic wiring technology in printed circuit boards, using a layer of electroless plating layer provided on a pattern formed by photoresist as a guide, the circuit forming technology has been developed by the additive plating method which is to conduct lamination by electroplating on that.

In these conventional plating techniques for the fabrication of LSI etc., social demands for ensuring the cross-sectional area of wiring in printed boards are the more increasing, so that high aspect ratio of lead wire is strongly requested. In the above conventional plating methods, when using photolithographic technology, there are problems on the cutting margins in irregular shape such as over etching and under etching as will be discussed in FIG. 11. Furthermore, in the additive plating method excluding etching, though it is possible to make wiring finer than in the conventional one as will be explained in FIG. 12, there occur problems on the irregular deposition due to burrs etc. (Wakabayashi, et al., Journal of The Surface Finishing Society of Japan, Vol 52, p 494, 2001)

Meanwhile, the environmental control on the surface finishing industries including plating and coating has become more and more crucial, and the further improvement has been required. Especially, concerning the waste-liquid treatment, legal regulation toward the ban on the use of items identified to be basically hazardous is now going on. Reflecting such a situation, it has been strongly required to introduce new processes of recycling type.

Furthermore, there are wire-cut electrical discharge machines and methods using lasers and electronic beams in the grooving process of microscopic and complex shapes but there is a case to be impossible to process materials which have three-dimensional complex shapes since the wire-cut process is mainly performed in two dimensional shape. As for the methods to use lasers and electronic beams, the lasers and beams cannot be applied to the portions in three-dimensional complex shape.

3. DISCLOSURE OF INVENTION

Problems to be Solved by the Invention

The present invention is performed to eliminate the defects of the above conventional technologies, and the object is to decrease the viscous resistance by walls in spite of a microscopic liquid channel of microreactor. The other object is to improve the reaction efficiency by increasing the mixing efficiency in the liquid channel of microreactor. The other object is to largely expand the scope of application to the reactions of microreactor by introducing surrounding fluids in the reaction systems, which were impossible for the conventional microreactors of groove processing, that is, the objects are to increase the magnetic efficiency by the surrounding fluids, to make it possible the mass transfer between a reaction liquid in a microscopic liquid channel and a surrounding fluid and to control the reaction conditions such as temperature, pressure, etc. by the surrounding fluids. The other object is to enable the microreactor to remove reaction-product gas etc. by adopting non-closed systems. The other object is to make a microreactor which does not disturb fluent flows even when there exist solids deposited in such a system operating reactions and when there exist solid whose component in original liquid is deposited by the difference of solubility. The other object is to enable the microreactor to perform complicated reactions and analyses, which can easily and conveniently make microreactors with parallel flows and branched channels. The other object is to enable microreactors to have little troubles on the static electricity generated by friction etc. of liquid even when the flows are controlled by electrostatic forces, i.e., by electromagnetic valves and electrodes installed in the channel. The conventional microreactors are required to finish enclosed spaces without leaking reaction liquids with high accuracy, so that the object of the invention is to fabricate non-closed microreactors, which is difficult to realize even with latest technology not only from a costwise point but also to process a liquid channel with many curves for a compact apparatus. The object of the invention is to present easily and conveniently a microreactor that is easy to produce an apparatus and that has a microscopic liquid channel no matter how it is curved. The other object lies in to provide plating to a solid material placed in a liquid channel of a microreactor, to make it possible to form finer circuit wiring than that of the subtract method and the additive method used for circuit formation of the conventional LSI etc. and further to enable cyclic usage of plating solution. The other object is to enable microreactors to perform processing such as etching and also to provide microscopic processing to the portions in three-dimensional complex shape, and furthermore to enable the microreactors to fabricate a new microreactor.

Means to Solve the Problems

The present invention concerns a microreactor of a completely new type by further advancing and developing the conventional microreactor and resolving problems of the conventional microreactors. A microreactor means a minute reaction apparatus and is an apparatus to react continuously by flowing reaction liquids in channels of the order of several micrometers (μm) to several millimeters (mm). In a microreactor of the invention, an introduction zone of liquid that introduces liquid to conduct reaction etc. to this microscopic liquid channel and a liquid discharge zone that discharges reacted liquid are included. An introduction zone of liquid conducting reaction is preferable to have more than one introduction zones in case of reaction liquids consisting of more than one liquids, but there are cases to conduct a reaction at a special reaction condition (for example, such as an interaction with surrounding liquid as explained below) such as a microscopic liquid channel is high temperature even the introduction zone is one. In addition, although there is the necessity of adding forces of pressure, voltage and so on to overcome friction resistance of a liquid passing through a microscopic liquid channel in conventional microreactors, in the invention, these pressure and so on are not necessary; since there is few friction resistance of the liquid passing through the channel and only a simple gate may be possible, it is also one of the characteristics of the invention that an introduction zone is of a very simple structure.

Liquid flow of the invention can be also conducted, as described above, by pressure and natural convection caused by the head of liquid but there is also a case that it is preferable to be fed by a pump such as syringe pump etc. In this case, a pump is installed only in an introduction zone and it may be also overflowed from discharge zone, in that case following various inventions regarding the discharge zone shall become effective. Also, a pump can be set only at the discharge zone; in this case, only discharged quantity by a discharge pump is introduced from the introduction zone. Further, pumps can be also set both in the introduction zone and the discharge zone and in this case, the pumps are operated considering the balance of capacity of each pump, piping resistance, etc.

In the invention, since the friction resistance at a liquid channel is very low, it especially needs to contrive that the discharge zone of liquid where reaction etc. have not generated the resistance in discharging at a discharge zone and not to interrupt the flow. One of the contractions is to eliminate a magnetic barrier at the discharge zone, as the next measure, it is desirable to give consideration to have low resistance in discharging such as to install plural discharge zones or wide discharge zone as shown in details in the drawings.

A microscopic liquid channel of the invention is characterized by the fact that it is formed by magnetic barriers by band-like ferromagnetic. "Band" means a continuous substance having a constant width, and its length is larger in dimension than the width, including line forms and ribbon forms. A ferromagnetic substance is said as to a substance easily magnetized in a magnetic field, in the invention, it is magnetized to have magnetic force of preferably 10 $T^2/m$ or more, further preferably 40 $T^2/m$ or more and most preferably 100 $T^2/m$ or more. Here, magnetic force is said as to the quantity defined by a product of magnetic flux density (B) and a gradient of the magnetic flux density (dB/dx) where x denotes length (m). A magnetic barrier means a wall of constant magnetism preventing a flow of liquid having magnetism by a ferromagnetic substance and a diamagnetic substance, which have a case to be used in combination with that and magnetic action according to the action of a ferromagnetic substance. As for various embodiments of magnetic barriers by ferromagnetic tracks, are going into details in the drawings. "A liquid channel formed by magnetic barriers" in the invention is said to form a channel that liquid having magnetic force by magnetic barriers generate a flow in the direction of no barrier, and its form is not necessarily be uniform, can take various forms such as a line or a sheet. Various other choices are possible concerning dimension, thickness, material, and directions (which can be taken "upward to a plain surface", "downward to a plain surface", and "sideward to a plain surface" and so on).

A liquid channel that has been formed by the magnetic barriers of the invention is allowed not only to have a single band, but also to have more than one band, which is placed in parallel form, and extraction, absorption, reaction, etc. are possible between liquid channels. A liquid channel in a single band shape also have more than one branches; from each of them, feeding reaction liquid and inspection liquid allow multi-stage reaction and inspection, and analysis, inspection, etc. of the subject liquid of the operating stage can also be done by discharging a portion of liquid from the branch. In the conventional microreactor by the groove processing, complex groove processing such as paralleling and branching leads to difficulties intrinsic to microscopic processing, but the liquid channel formed by the magnetic barrier of the invention can be simply and conveniently produced only by installing ferromagnetic tracks in parallel and branched modes.

A ferromagnetic track of the invention is usually installed on a substrate and the substrate also becomes a part of the microreactor. The substrate consists of a board and a film of plastic, metal, inorganic material, etc. It is also possible to set up ferromagnetic tracks on the substrate covered with inert films such as fluorine resin, silicone resin, acrylic resin and so forth; liquid channels on the films formed by magnetic barriers are also possible. It is also possible to install a band-like magnetic barrier by forming a band-like etching on a board of a ferromagnetic substance without installing a substrate particularly.

It is preferable on a point that a strong magnetic field is formed that a microscopic liquid channel of the invention is formed by magnetic barriers produced by ferromagnetic tracks according to be applied by an external magnetic field.

An external magnetic field is a magnetic field generated by a magnetic force generator located the outside of the microscopic liquid channel. Magnetic flux density of the external magnetic field in the invention is preferably 0.01 T (T is Tesla) or more, further preferably 0.1 T or more and most preferably 0.5 T or more. It is the reason why effects of viscosity resistance, agitation effect, etc. of the invention are low when the magnetic flux density is below 0.01 T. The microscopic liquid channel in the invention is formed by ferromagnetic tracks. The external magnetic field does not only set height of a magnetic barrier by the ferromagnetic track like this, but also controls velocity of liquid passing through the channel to perform reaction etc. and degree of mixing of liquid, and can also have a control function of the reaction and so on. Formation of the external magnetic field is possible by a permanent magnet, a conventional electromagnet, a superconducting magnet, etc. Also, a direction of magnetic field is possible for complex direction such as upward or downward direction, a horizontal direction, an oblique direction and furthers a curved direction. In addition, the magnetic field does not necessarily be uniform, an uneven magnetic field and a time-varying magnetic field can also be used. By placing a ferromagnetic substance in the magnetic field, it is possible to give non-uniformity to the external magnetic field and to enhance the magnetic field.

In a microreactor of the invention, changes of chemical conditions of substances and mass transfer occur by the operations such as chemical reaction, mixing, extraction and absorption in a process where reaction liquids pass through the microscopic liquid channels. It is the object of the microreactor of the invention is to conduct the change of the chemical conditions and the mass transfer by these operations. The operation means a unit operation in chemical engineering and means reaction, mixing, extraction and absorption. The chemical reaction in the invention is especially suitable for normal fine chemical and biochemical reaction, and there is control of chemical reaction utilizing a magnetic field effect as a peculiar effect in the invention that is not in the conventional microreactor. Also, in the conventional chemical reaction, extraction and absorption, when progress of reaction etc. is poor as mixing of each other liquid is bad because of the reason such as liquid viscosity is high in the microreactor of the invention, progress of reaction and so forth is smooth as mixing effect is good.

In the invention, it is prerequisite for subject liquid introduced to the microscopic liquid channel conducting reaction etc. to have magnetism. It is the reason why formation of a definite channel is possible by an interaction with magnetism of a ferromagnetic track. The magnetism of the subject liquid is not only ferromagnetism but also diamagnetism or paramagnetism, which is used separately depending on various types of the magnetic barrier. The magnetism of the subject liquid is also the magnetism owned by the subject liquid itself such as solvent, and it is possible to have the specific magnetism adding magnetic substance to the subject liquid. Liquid usually have the magnetism, but there is a case to have little magnetism negating mutually depending on the components of liquids, so that there is a case where little effect of the channel formed by the magnetic barriers of the invention exists. Accordingly, in the invention, the volume magnetic susceptibility of a liquid passing through the microscopic liquid channel is preferably $\pm 1\times 10^{-6}$ or more, further preferably $\pm 5\times 10^{-6}$ or more and the most preferably $\pm 1\times 10^{-5}$ or more. Still, the meaning of $\pm$ that is + (plus) means a paramagnetic substance and − (minus) means a diamagnetic substance. Here, the term "or more", means that absolute value is "or more". Also, the magnetic susceptibility of the subject liquid, when surrounding liquid exist there outside the subject liquid, is defined by the relative magnetic susceptibility in view of the magnetic susceptibility of the surrounding liquid, and the relative magnetic susceptibility is desirable to be in the range of volume magnetic susceptibility in the case where the aforementioned surrounding liquid does not exist. As for substances that give magnetism to liquid, it can be applied to all substances that can pass through the channel such as gases, liquids and solid particles other than dissolving materials such as metal salts, liquid and gas, which can mutually dissolve. As for these materials, ferromagnetic substances, paramagnetic substances, diamagnetic substances and all other kinds of magnetism can be used if necessary. In addition, as for the relative magnetic susceptibility, a measuring method of the magnetic susceptibility by Japanese Patent Laid-Open No. 2000-221251 can be used.

Also, in the liquid (subject liquid) introduced to the microscopic liquid channel of the invention gas of several % (weight %) or less and solid (unrestricted content) can be contained in dispersion; the case where liquid and gas are mixed in the so-called critical state is also included in the invention. It is because there is a case that the reaction condition is the most suitable in the critical state. In addition, there is a case where gases and solids are necessary for the operation of reaction etc. and especially solids is difficult to actively use in the conventional groove processing since there were many cases disturbing the flow. But in the liquid channel form microreactor formed by the magnetic barriers of the invention, these can be used advantageously since these are hardly obstacles.

In the microreactor of the invention, it is characterized in that the outside of the liquid channel can be filled with the surrounding liquid. Although the liquid channel is formed on a substrate of the microreactor, "the outside of the liquid channel" is said as to a portion that has no contact with the substrate of the liquid channel. In the microreactor formed by the conventional groove processing, it is not possible to install such surrounding fluid or if it is possible, only to limited space of an upper portion of the groove. In the invention, it is possible to set up the surrounding fluid since it is not needed for the outside to be sealed hermetically. As shown in FIG. 5, a narrow region only contacts with the substrate that it is possible to make almost all of a surface area contacts with the surrounding fluid. In the surrounding fluid, there are surrounding liquid (surrounding solution), surrounding gas and mixture fluid of gas and liquid. Usually air is used for the surrounding gas but when it is desired to react actively with the subject liquid running the microscopic liquid channel, a reactive gas is selected. In addition, if the subject liquid dislikes reacting with oxygen in air, an inert gas such as nitrogen is selected.

When surrounding fluid is liquid, there is action to enhance the magnetic effect of the liquid channel formed by the magnetic barriers of the invention by an interaction of the magnetism by the difference between the magnetism of the liquid running in the channel and magnetism of the magnetic susceptibility rate of surrounding liquid. Also, as reaction and mass transfer with the subject liquid and the surrounding liquid can also be done, it was made possible to conduct further widely the operation of reaction, mixing, extraction, absorption, etc. which the microreactor of the invention conduct. And the surrounding liquid also has temperature control function which has reaction etc. in the channel conduct at constant temperature.

Applying the microreactor of the invention and installing a solid in the outside of the microscopic liquid channel of the microreactor, it is possible to provide plating along with the liquid channel to the solid by plating solution flowing in the liquid channel. Here, as for the solid, metal, plastic, inorganic material and also natural material like wood and so on are used. Plating is said as to reducing and attaching metal ions dissolved in the solution on a surface of a solid of metal, plastics, etc. and there are electroplating that the solution deposit metal on a solid electrochemically by electrolyte and electroless plating that deposit metal coating on a solid surface by each other metal's chemical substitution, reduction reaction and so on, in the invention, the either mean can be used. Plating solution is said as to a solution the subject metal is dissolved. As for metals used for plating, various metals such as gold, silver, copper, tin, cobalt and aluminum can be used. Also, it is possible to produce a microscopic pattern to have magnetism by plating a material body having magnetism such as metal oxide of ferrite and so forth.

Applying a plating technology of the invention, it is possible to form further a ferromagnetic track material of a substrate for the microreactor of the invention. Namely, using the same material (a substrate to be processed) as a substrate of the microreactor of the invention (a substrate for processing) for a solid to be plated, it is possible to provide plating having magnetism in a band pattern on a substrate to be processed by flowing electrolyte containing metal oxide of ferrite etc., and salt of magnetic material of cobalt etc. in the microscopic liquid channel of a substrate for processing, and the plated substrate to be processed can be a microscopic liquid channel of liquid of a new microreactor of the invention.

As plating means in the invention, further developing a plating method using the abovementioned magnetic barrier. It is possible to provide electroless plating to a solid by flowing electroless plating solution in a liquid channel formed by magnetic barriers. Further by flowing electroplating solution in the liquid channel, it is possible to provide electroplating on an electroless plating layer generated by electroless plating (an additive plating method by a magnetic barrier mask). In an additive method by magnetic barriers of the invention, after taking the advantage of a conventional additive plating method, the magnetic barrier portion perform a role of a mask that liquid does not pass through (hereinafter a magnetic mask) at the same time ensuring a liquid channel that a plating solution passes through by magnetic barrier in stead of a photosensitive resin mask produced by the conventional photoresist. By conducting electroless plating and electroplating using this magnetic mask, circuit formation is performed. Masks by the conventional photosensitive resins have required complex processes such as a process to attach photosensitive resins, a process to expose a constant pattern and a process to elute an exposed portion resins or to elute unexposed parts by acting solution of photosensitive resins. Not only be expensive by complex processes but also eluting photosensitive resins in plating solution, reuse of plating liquid was hindered and made waste liquid treatment difficult. While on the other hand in the invention, these problems are all solved as such photosensitive resin masks are not used.

In an additive plating method using magnetic barriers of the invention, it is possible to make the outside of places flowing plating solution to be filled with surrounding liquid in both processes of electroless plating and electroplating. As for surrounding liquid, also various functions and effects in operation using magnetic barriers heretofore have described, can be effectively used too in the additive plating method using this magnetic barrier. Further adding to these functions, especially in plating, there are many cases that solution shall be connected with environmental pollution such as plating solution is poisonous that its role is especially important, preventing splashes of plating liquid and absorbing produced gases, and in electroplating, it plays effective role from also workability aspects such as no needs to directly contact a plating substrate with a counter electrode.

Moreover, applying a microreactor of the invention, and installing a solid in the outside of the microscopic liquid channel of the microreactor, it is possible to provide etching to the solid along the liquid channel by corrosive liquid flowing in the liquid channel. A solid in this case, also the same as plating case, metal, plastic, inorganic material and natural material such as wood are used too. Here, the corrosive liquid is said to the liquid that has action to chip off the solid by dissolution, corrosion, oxidation, reduction, etc. acting the solid to be processed. For example, when the solid to be processed is plastic, solvent to dissolve the plastic is used, and when the solid to be processed is metal, electrolyte to conduct electrolysis corrosion to the metal is used. In this electrolysis corrosion, electrolysis etching when applying current is also included. By such etching of the invention, microscopic groove processing and pattern processing consisted mainly of groove processing were made possible.

Further, when forming a microscopic liquid channel of a microreactor having a liquid channel formed by magnetic barriers of the invention, forming ferromagnetic track material on a substrate to be produced according to installing a substrate of the a microreactor going to produced (a substrate to be produced) with a little opening on a substrate of the microreactor of the invention (a microreactor for producing a substrate) and flowing plating solution with magnetism in the microreactor for producing a substrate, make it possible to manufacture the microscopic liquid channel of the microreactor having the liquid channel formed by magnetic barriers.

It is possible to form ferromagnetic track material of the invention by printing the materials including magnetic materials. As printing is to print a fine powder of magnetic materials in a band like on a substrate instead of pigment, not only normal printing means of transcription etc. but screen-printing, ink-jet printing, etc. can also be used. According to be printed "in a band like" of the invention, it is possible to produce a magnetic barrier easily and conveniently forming a microscopic liquid channel of the microreactor of the invention.

Advantages of the Inventions

In the microreactor by the conventional groove processing, although it had a defect to have larger viscosity resistance of liquid flowing the microscopic liquid channel as the more microscopically the liquid channel being made the larger surface area to volume of flowing liquid becomes, viscous resistance is lowered beyond comparison by the microreactor having the liquid channel formed by the magnetic barrier of the invention which is possible to lower down to almost ignorable degree. According to this, the flow of liquid in the microreactor becomes do so smooth that it was possible to increase substantially the function of the microreactor. Moreover, in the conventional microreactor by groove processing, the liquid flowing the microscopic liquid channel is basically laminar flow and has no mixing effect, but in the microreactor having the liquid channel formed by the magnetic barriers of the invention, the mixing effect has easily generated as viscosity resistance in the channel is extremely low, so that the reaction efficiency of the subject liquid in the microreactor can be greatly increased.

Also, it was possible to largely expand applicable scope of the reaction of the microreactor by introducing surrounding liquid to a reaction system in the invention that was impossible with the microreactor of the conventional groove processing, increasing magnetic effect by surrounding liquid and further enabling the mass transfer between the subject liquid flowing the microscopic liquid channel and surrounding liquid.

Further, in the conventional microreactor of groove processing, although it is impossible to eliminate gas generated by the subjected chemical reaction since the liquid flows in a solid wall; in the invention, the produced gas is easy to go out because it is not enclosed with a solid wall. Also, when it is enclosed with the surrounding liquid, it was also possible to absorb and eliminate the produced gas by choosing the surrounding liquid as the one easily absorbing produced gas. In addition, even when there exist solids deposited by the operation system such as reaction and solids contained in original liquid separated out by the difference of solubility; in the invention, it was possible to be the microreactor of no trouble to flow.

Moreover, the microreactor of the conventional groove processing is necessary to conduct microscopic groove processing by precise machining but the more the channel becomes microscopic, the more the processing becomes difficult and it was virtually difficult not merely from costwise to finish accurately enclosed space of microscopic liquid channel without a leak of the subject liquid. Also, the processing of the microscopic liquid channel having many curves to ensure a long reaction channel by making compact the microreactor was difficult to realize even with the latest technology. In the invention, only installing the ferromagnetic track on the substrate, it was easy to produce and possible to provide a liquid channel simply and conveniently how it is winded. Further, it was possible to adapt easily and conveniently also to the branching and the liquid channel of the parallel flow.

Moreover, by plating to a place of a microscopic and complex shape, conventionally, the treatment such as resist processing and water repellent finishing has brought to a microscopic and complex shape of the material to be plated, but conducting the water repellent finishing etc. leaving a microscopic pattern was not only at large cost, but also virtually difficult due to narrow space and complex shape. In the invention, it was enabled the plating to a microscopic portion in complex shape formed by ferromagnetic tracks using the liquid channel formed by the magnetic barriers of the invention.

In an additive plating method using the magnetic barrier of the invention, different from the conventional subtract method which produces cutting stock having irregular shape such as over-etched portion and under-etched portion, and different from irregular deposited surface such as burrs on wiring side surface when laminating as means for circuit formation using additive method not including the conventional etching, line width in the wiring of LSI etc. can be made finer than that of the conventional technology. Also, for electroplating, in the invention, a counter electrode can be placed away from a substrate since surrounding liquids can be used in plating environment, so that plating work becomes simple and easy. Then, in the plating method of the invention, plating solution is in a small quantity since the plating solution flows only through narrow liquid channels formed by the magnetic barriers, and its viscosity is low since photosensitive resin, as will be described later, does not mix in; that is, the plating solution can be handled easily. Furthermore, the plating method of the invention allows us to omit the processes to coat photosensitive resin and to remove it after exposure since photosensitive resin is not used as a mask in the conventional methods; because the magnetic barriers perform a role of the mask, not only the processes are simplified largely but also cyclic usage of plating becomes possible as photosensitive resin does not dissolved into waste liquid after plating, so that the processes become costwise cheaper and generate an outstanding effect, from an environmental point of view, for eliminating waste liquid treatment.

Furthermore, for the processing of grooves in microscopic and complex shapes, there are wire-cut-electric-discharge machines, and other methods to use laser or electron-beam; however, the wire-cut machines are mainly used for two dimensional processing, so that sometimes they were not applicable to materials in three dimensional complex shapes. Also, there were some cases where the method using laser or electron beam cannot be applied to the portions in three dimensional complex shapes where laser or electron beam cannot used. The invention makes it possible to fabricate grooves or etched forms in microscopic and complex shapes on a substrate by installing a ferromagnetic track to a chamfered substrate on which liquids flow to cut off the substrate. Then, using the products, microscopic liquid channels of the microreactor of the conventional type could also be produced.

Moreover, when forming microscopic liquid channels on the microreactor composed of the liquid channels formed by the magnetic barrier of the invention, installing a substrate of the microreactor to be produced (a substrate to be produced) is put in a small distance on a substrate of the microreactor of the invention (microreactor for substrate production), and then it is possible to manufacture the microscopic liquid channels of the microreactor having the liquid channel formed by the magnetic barriers by depositing ferromagnetic tracks on the substrate to be produced, which are made by flowing plating solutions for magnetization on the microreactor for substrate production.

4. BRIEF DESCRIPTION OF DRAWINGS

FIG. 3 is examples of various illustrative embodiments for discharge zones of microreactors of the invention.

5. DETAILED DESCRIPTION OF THE INVENTION

Examples of the modes for the invention are described based on the drawings.

Figure 1:
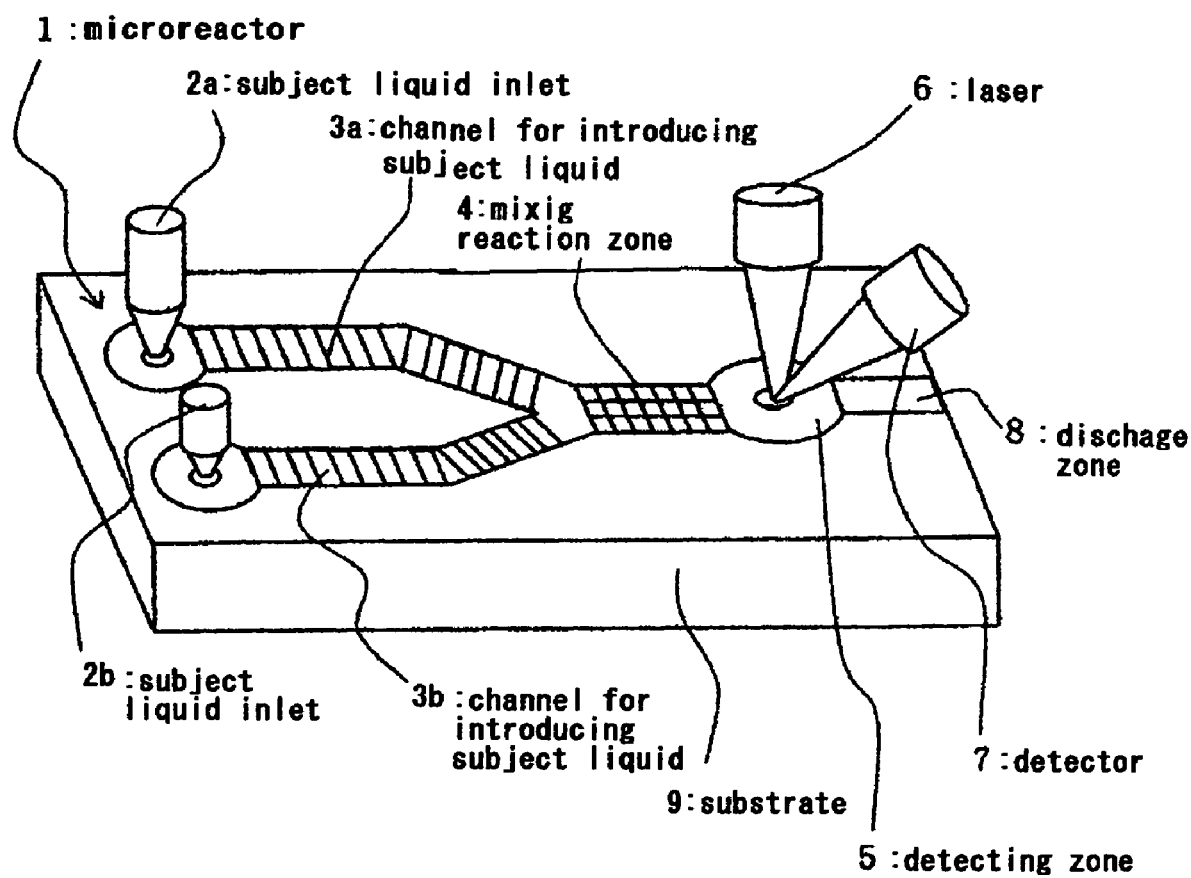
FIG. 1 shows a schematic view of constitution for a microreactor of the invention.

FIG. 1 shows an example of constitution for a microreactor 1 of the invention. Subject liquids introduced through subject liquid inlets 2a and 2b are constituted to conduct operation such as mixing and reaction at a mixing reaction zone 4 after passing through channels for introducing subject liquid 3a and 3b. The operated subject liquid is constituted to be able to know the operating situation; in this example, a light radiated from laser 6 is received at a detection zone 5. The reflected light is received by a detector 7 to inspect the spectrum of the reflected light. The inspected subject liquid is discharged from a discharge zone 8. Two subject liquid inlets 2, two channels for introducing the subject liquids 3, a mixing reaction zone 4, a detection zone 5 and a discharge zone 8 on a substrate 9 constitute a microreactor 1. In the microreactor of the invention, at least this mixing reaction zone 4 is composed of a liquid channel having magnetic barriers that will be hereinafter described. Though not being shown in this drawing, a ferromagnetic track is settled on the substrate 9 or embedded inside the substrate 9, so that magnetic barriers along the ferromagnetic tracks are formed, which constitute liquid channels to introduce subject liquids 3 and the mixing reaction zone 4.

Figure 2A:
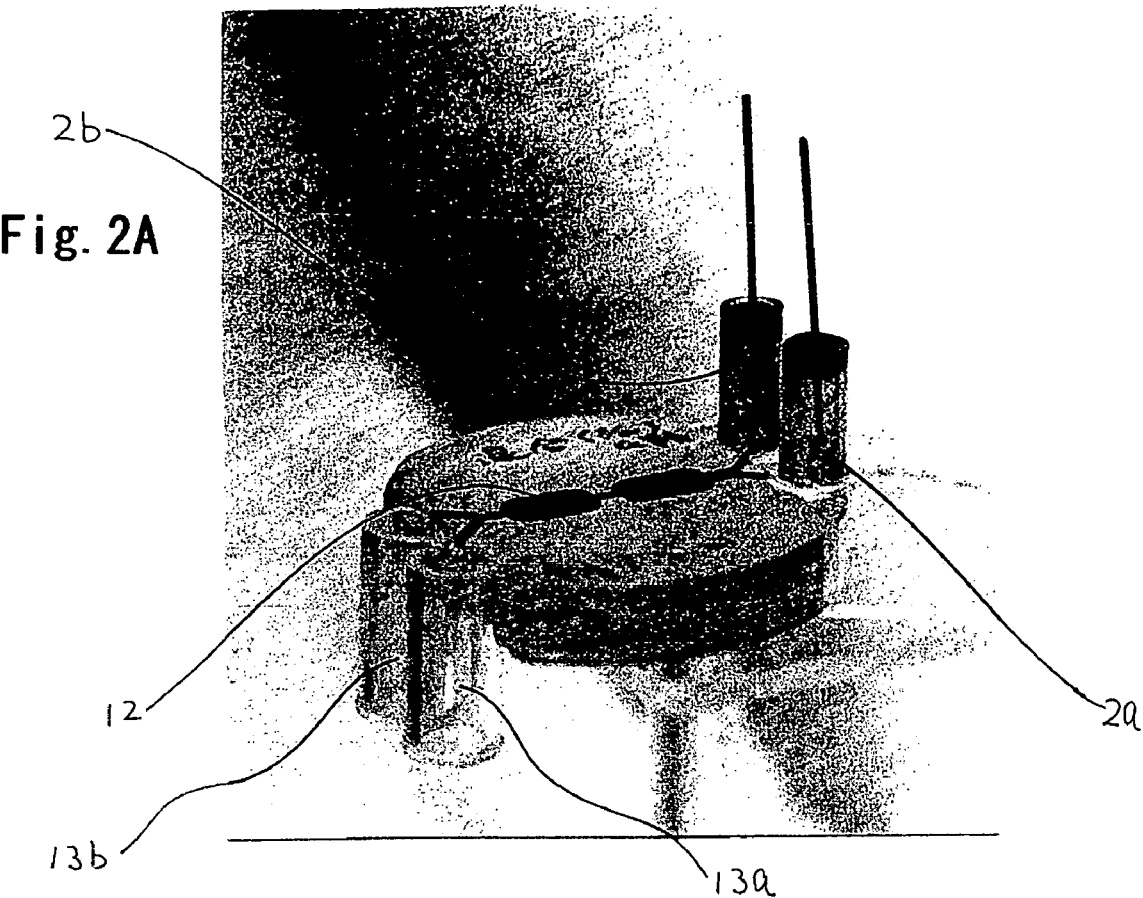
FIG. 2A shows a real photograph of an appearance of the other type microreactor of the invention.
Figure 2B:
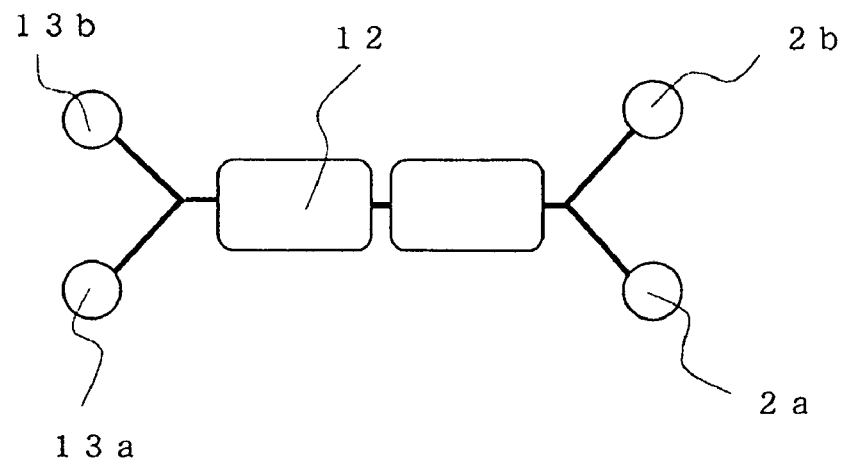
FIG. 2B shows a schematic view of a shape of its mixing reaction zone.
Figure 3A:
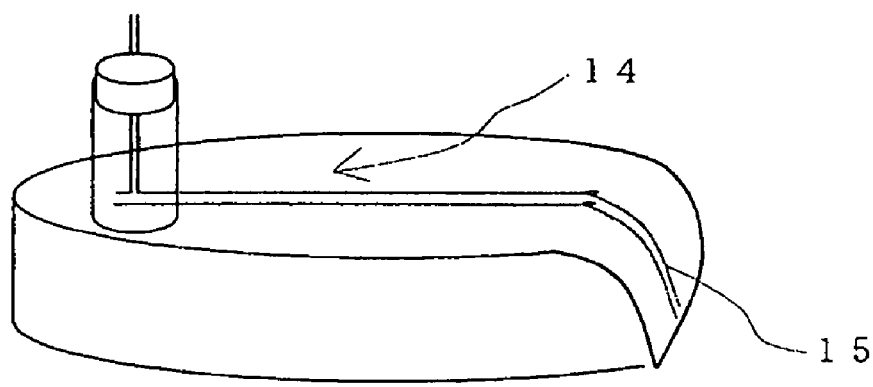
FIG. 3A shows the schematic view.
Figure 3B:
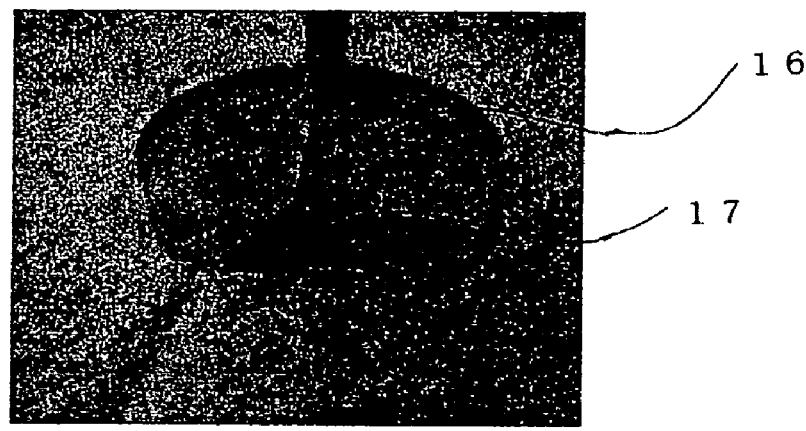
FIG. 3B shows a real photograph.
Figure 3C:
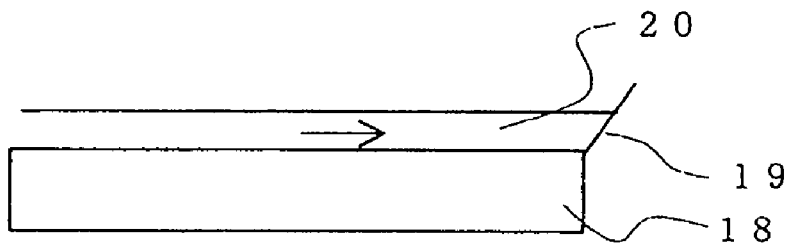
FIG. 3C shows a model view of a magnetic barrier occurs at the end of a ferromagnetic track and FIG. 3D shows a model view reducing a magnetic barrier at the end.
Figure 3D:
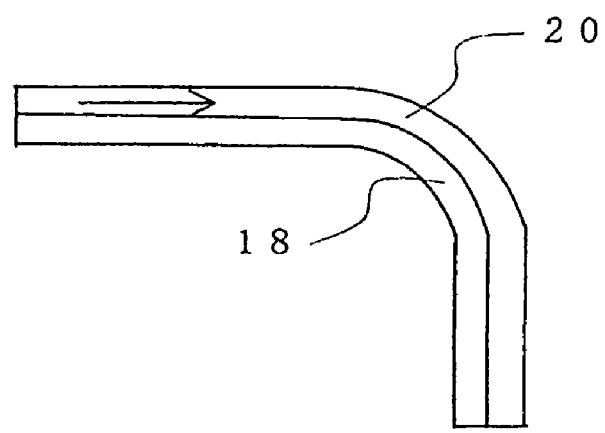

FIG. 2A shows a photograph of a microreactor 11 as an example of microreactors of the invention, and a model of the constitution is shown in FIG. 2B. The subject liquid introduced through the subject-liquid inlets 2a and 2b are discharged from the bifurcated discharge zones 13a and 13b through the mixing reaction zone 12. The mixing reaction zone 12 has a structure with two relatively wide channels (6 mm wide, 10 mm long) connected by a narrow channel (1 mm wide, 3 mm long), which are composed of the channels with the magnetic barriers. An example of the experiments for mixing by the apparatus of FIG. 2B will be described in FIG. 6.

FIG. 3 shows the examples of various modes of a discharge zone of the invention. As for an example where the bifurcated discharging zone has been already shown in FIG. 2. FIG. 3A is a photograph of a trial product for the microreactor 14, where the discharge zone 15 is curved downward for easy discharge by use of the gravity force of the subject liquid. FIG. 3B is another photograph of the microreactor as a trial product 16 for easy discharge of the subject liquid, of which the discharge zone is widened in the forward direction and curved in the downward direction 17. In this invention, various devices for the discharge zones are required, because in liquid channels formed by a magnetic barrier, magnetic barriers occur even in the discharge zones. As a model case, FIG. 3C explains a magnetic barrier at the end of a liquid channel; a subject liquid 20 must get over such a magnetic barrier 19 at the end of a ferromagnetic track 18. FIG. 3D exhibits that a subject liquid 20 flows smoothly over a ferromagnetic track end 18 bended in a curve.

Figure 4A:
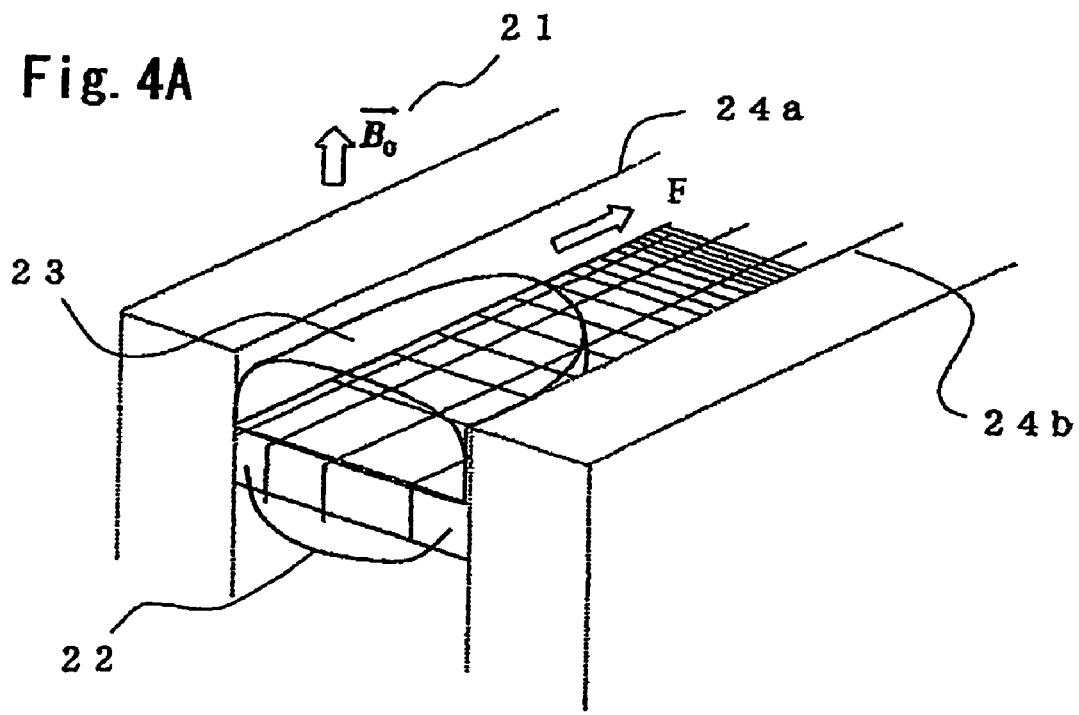
FIG. 4A and FIG. 4B show two examples of principle views occurring liquid channels formed by magnetic barriers of the invention.
Figure 4B:
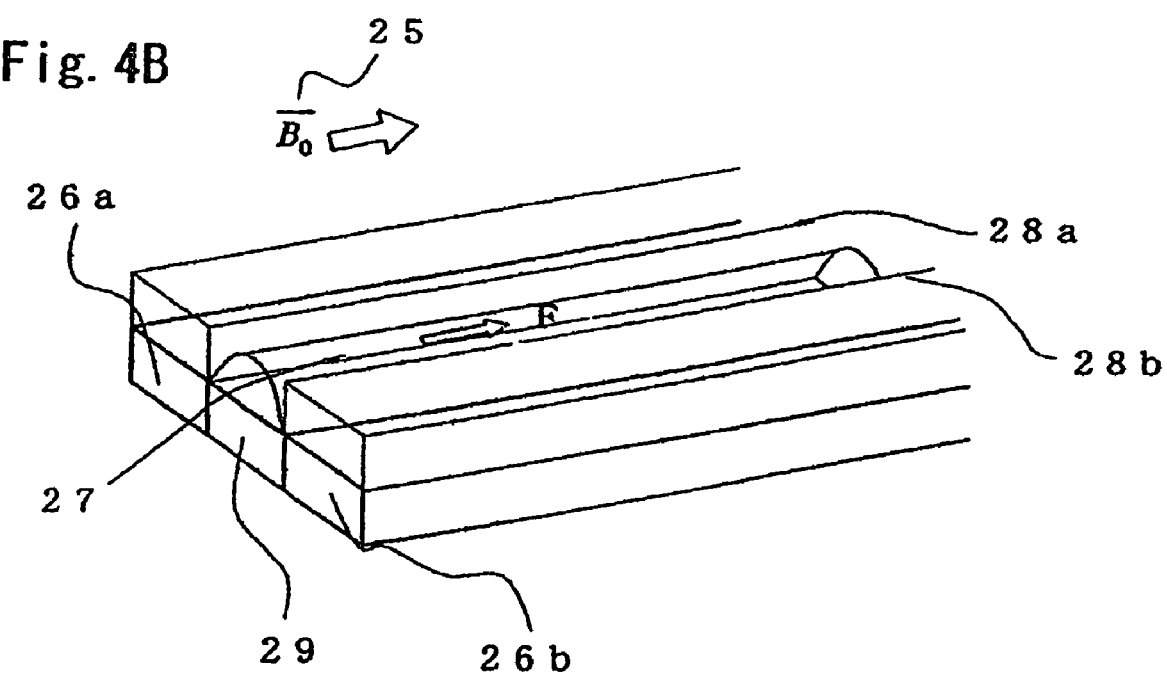

FIG. 4 schematically shows two examples of principles of magnetic barriers, where according to the invention, liquid channels are formed. In FIG. 4A, a ferromagnetic track 22 is magnetized by an external magnetic field 21 (magnetic flux density B) in the direction of an arrow (which is perpendicular to the ferromagnetic track 22); magnetic barriers of 24a and 24b arise from the interaction between the magnetism of the ferromagnetic track 22 and that of a subject liquid 23 (paramagnetic), and a driving force F acts on the subject liquid 23 in the arrow direction. Though not a visible solid material, the magnetic barrier 24 becomes a barrier against the subject liquid 23, which forms a channel of the subject liquid 23 flowing in the direction of F. FIG. 4B represents other example, i.e., ferromagnetic tracks 26a and 26b are magnetized by an external magnetic field 25 of magnetic flux density B in the direction of an arrow (parallel to the ferromagnetic tracks 26a and 26b), so that magnetic barriers 28a and 28b is generated by the interaction between the magnetism of ferromagnetic tracks 26 and the magnetism of a subject liquid 27 (diamagnetic), and the driving force F works against the subject liquid 27 in the arrow direction. Magnetic barriers 28 become the barriers against the subject liquid 27, which forms a channel flowing toward the F direction. In the space between the two ferromagnetic tracks 26a and 26b, it is recommended for a diamagnetic plate 29 to set, however, a plate without positive magnetism such as plastic etc. is also acceptable. In FIG. 2A and FIG. 2B, though external magnetic fields 21 and 25 are used, in the case where ferromagnetic tracks 22 and 26 have sufficient magnetic forces (the magnetic force of the ferromagnetic track should be 40 $T^2/m$ or more), external magnetic fields are not always required.

Figure 5A:
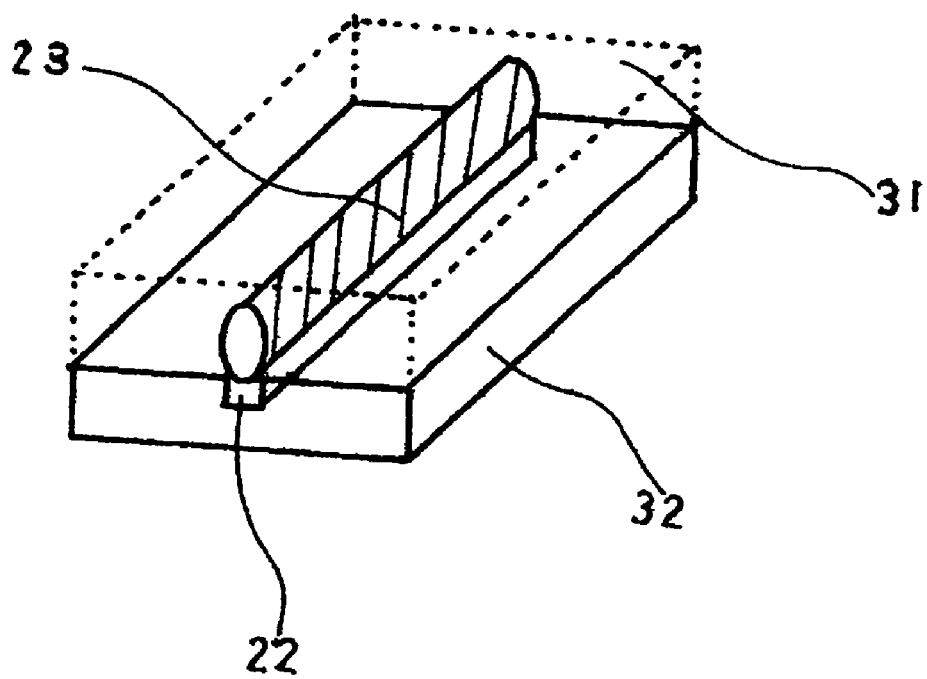
FIG. 5A, FIG. 5B and FIG. 5C show schematic views indicating various statuses of subject liquid flowing in liquid channels formed by magnetic barriers.
Figure 5B:
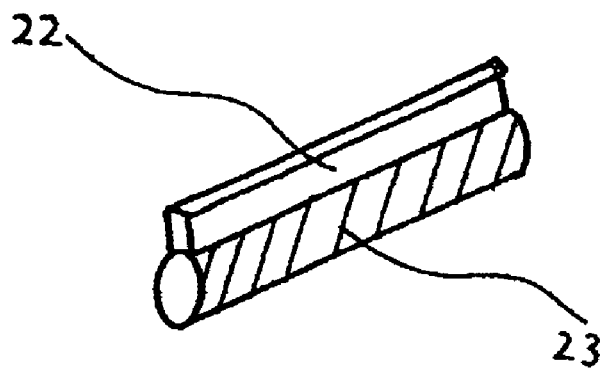
Figure 5C:
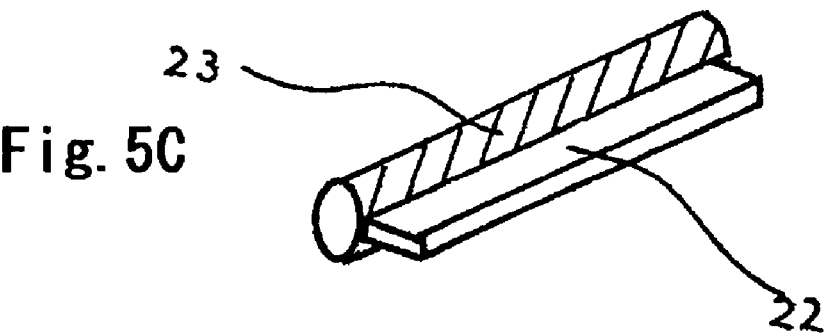

FIG. 5 shows the state of a subject solution flowing through magnetic barriers, which is based on the principle drawing that around a subject in FIG. 4A. FIG. 5A indicates a situation where the outside of the subject solution 23 is filled around with a surrounding liquid 31. Since only a narrow region of the liquid is contacted with a ferromagnetic track 22 on a substrate 32 (or on the film if there is a film layer on a ferromagnetic track), almost all the surface is contacted with the surrounding fluid 31. As for the positional relationship between the subject liquid 23 and the ferromagnetic track 22, the subject liquid 23 can flow through a liquid channel set under the ferromagnetic track 22 (FIG. 5B), and the subject liquid 23 can also flow through a liquid channel set on the side of the ferromagnetic track 22 (FIG. 5C).

Figure 6A:
FIG. 6A is an observation photograph showing an example of mixing in a microreactor, that indicates an embodiment of the invention
Figure 6B:
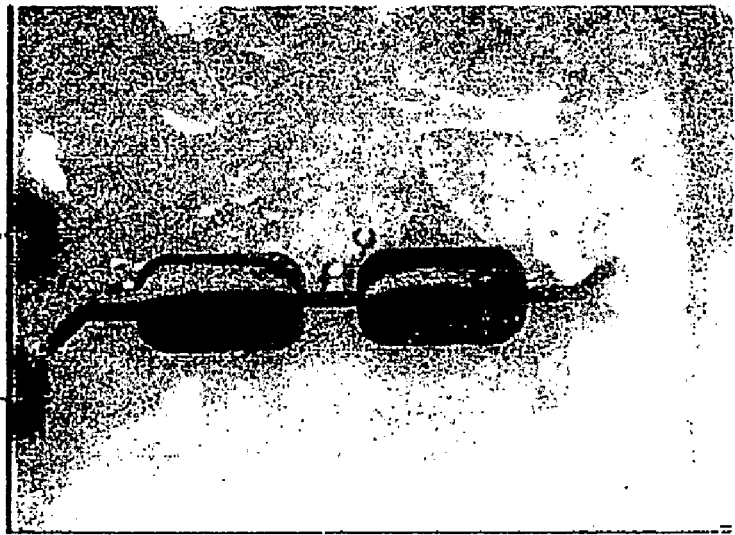
FIG. 6B shows a photograph of a groove system example of a conventional type.

FIG. 6 exhibits some photographs of the visual process in the apparatus in FIG. 2, i.e., the mixing process by subject liquids, which is one of various processes performed by subject liquids flowing through magnetic barriers of the invention. FIG. 6A shows an example of the invention; a subject liquid 41 of 1.4 mol/$dm^3$ nickel sulfate+white watercolor solution is introduced from a inlet 2a, and a subject liquid 41b of 1.4 mol/$dm^3$ nickel sulfate+black watercolor solution is introduced from a inlet 2b, and both liquids, which are injected by syringe pumps at the flow velocity of 0.1 mL/min. Both subject liquids 41a and 41b join together at the mixing reaction zone in a liquid channel formed by magnetic barriers (magnetic force of the ferromagnetic track should be 40 $T^2/m$ or more), being mixed by Karman vortexes. Quite effective mixing can be observed without external mixing operation. On the other hand, FIG. 6B shows an apparatus engraving a channel of the same shape as shown in FIG. 6A, which was used as follows; each subject liquid 41a and 41b was first injected in the velocity of 0.1 mL/min with a syringe pump in the absence of magnetic field (i.e., no magnetic field was applied), then, in spite of complicated channel form, as shown in the photo, the white and black solutions 41a and 41B flowed without mixing in laminar mode.

Figure 7A:
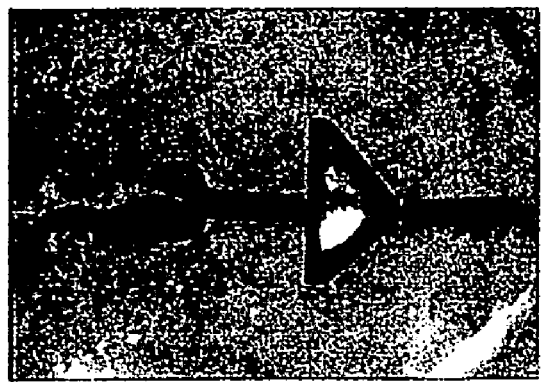
FIG. 7A, FIG. 7B and FIG. 7C show photographs indicating examples for liquid channels of various embodiments of microreactors of the invention.
Figure 7B:
Figure 7C:
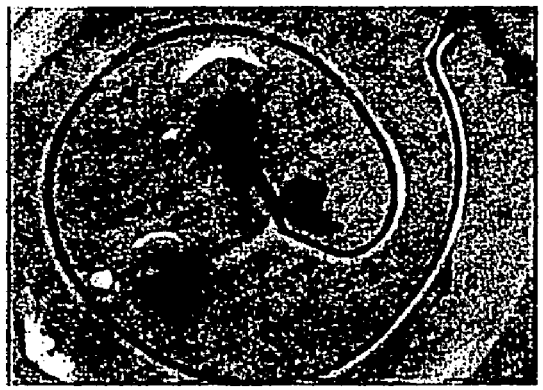

FIG. 7 exhibits some photos of the various shapes of the liquid channels formed by magnetic barriers. FIG. 7A shows a case where the cross-sectional area of a channel is not constant; white and black subject liquids injected from different inlets are once joined in a narrow channel, passing a narrow channel, passing a wide channel, passing a narrow channel again, then passing a wide channel again, and finally being introduced to a discharge zone. As shown in the photos, mixing efficiency increases by rapidly expanding and reducing the cross-sectional area of a channel. FIG. 7B shows a zigzag type of channel; white and black subject liquids from the inlets are joined together in a liquid channel formed by magnetic barriers, passing in zigzag mode along a ferromagnetic track, and being drained from a branched discharge area. The zigzag type shown in FIG. 7B has an advantage that a long channel can be made in a compact space, and the mixing efficiency increases. FIG. 7C shows a spiral type of channel, where white and black subject liquids from different inlets are joined together in a liquid channel formed by magnetic barriers in spiral shape, flowing along the channel to the discharge area. The spiral type in FIG. 7C has an advantage that a long channel can be made in a compact space, and long reaction time can be obtained. The liquid channels formed by the magnetic barriers of various types shown in FIG. 6 and FIG. 7 have also an effect to increase the reaction efficiency in the reactions such as fine chemical and biochemical reactions, since the mixing efficiency is large and large channel length can be used.

Figure 8:
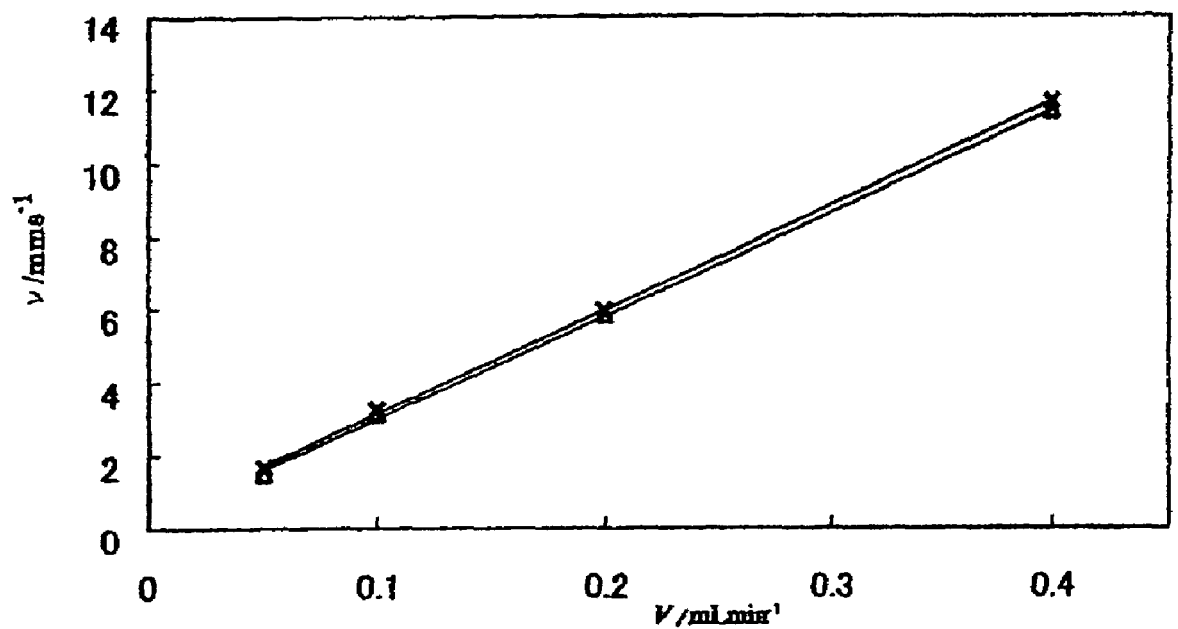
FIG. 8 shows experimental results indicating flow velocity by difference of viscosity of subject liquid in the invention.

FIG. 8 shows an experimental result that a subject liquid passing through a liquid channel formed by the magnetic barriers of the invention has low viscous resistance. In this experiment, the subject liquid is prepared in the following way; the kinetic viscosity was adjusted to be 1.21 cSt (Solution 1: × in FIG. 8) or 2.42 cSt (Solution 2: Δ in FIG. 8) by adding starch paste into 1.4 mol/dm$^3$ nickel sulfate solution. Moreover, small amount of carbon powder is also added in the solution for measuring flow velocity. The liquid channel of the microreactor (the ferromagnetic track is a steel strip of 1 mm width) in FIG. 3B was placed at the magnetic flux density of 3 T above the magnetic field center. After injecting the subject liquid in the liquid channel at the velocity of 0.05, 0.1, 0.2 and 0.4 mL/min, the flow velocity was actually calculated from the running time of the carbon powder between 20 mm interval in the liquid channel, and the result is shown in FIG. 8. The abscissa shows the injection velocity V (mL/min) and an ordinate shows the flow velocity (mm/sec) of the subject liquid. The flow velocity increases in proportion to the injection velocity. However, the flow velocities of Solution 1 and Solution 2 with different kinetic viscosities indicate almost the same values. Namely, the flow velocity of the subject liquid in the liquid channel formed by the magnetic barriers does not depend on the viscosity.

In comparison, 1.4 mol/dm$^3$ nickel sulfate solution (the kinematics viscosity is 1.21 cSt) is injected into the same kind of channel as shown in FIG. 8 (which is 1 mm wide, and the outside of the channel was surrounded by two solid walls of acrylic resin) at 0.4 mL/min with a syringe pump in the absence of magnetic field (not actively applying a magnetic field). Although it is impossible to directly compare this result with that of the magnetic channel of the invention since in the case of a solid wall microreactor of the conventional technology, to press a subject liquid into the channel by a syringe pump is required, and the flow velocity in the liquid channel depends on the pressure. In the present case, the flow velocity in the liquid channel was 2.9 mm/sec, which is ¼ times smaller than that of above case. In this case, the height of liquid was 2.5 mm at the injection point, which was pressed by the syringe pump, decreasing toward the discharge zone. However, in the case of the liquid channel shown in FIG. 8, at the injection velocity of 0.4 mL/min, the liquid flowed, keeping a constant height of 0.6 mm.

Figure 9:
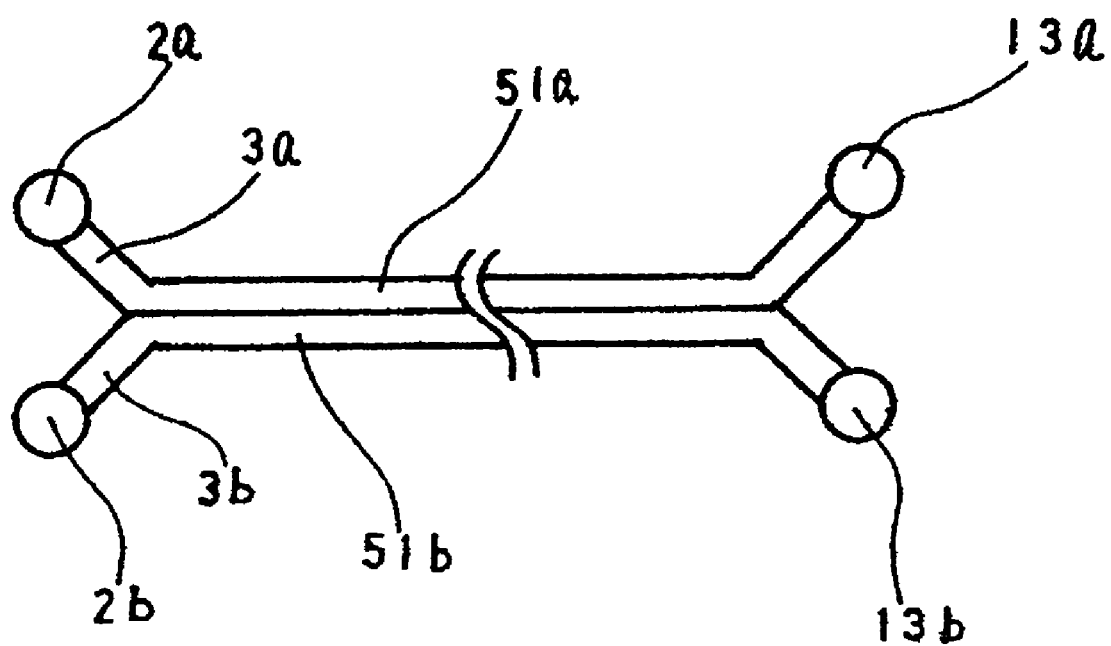
FIG. 9 shows a schematic view of a reaction apparatus according to parallel liquid channels of the invention.

FIG. 9 shows an example of the extraction and reaction between the liquid channels formed by the magnetic barriers placed in parallel configuration. 0.05 mol/dm$^3$ ethylenediaminetetraacetic acid (EDTA) solution was injected from the inlet 2a, and 0.1 mol/dm$^3$ nickel sulfate solution was injected from the inlet 2b, where liquid channels 51a and 51b formed by two ferromagnetic tracks were settled in parallel mode. Two subject liquids could flow in contact with each other. Though the reactor used here was a parallel type, which had, as shown in FIG. 7C, long liquid channels, a simplified form is shown in FIG. 9. Since the concentration of the nickel sulfate solution is higher than the EDTA solution, the nickel sulfate solution diffuses into the EDTA solution, generating chelate compound reacting with EDTA. EDTA solution is colorless and transparent. Green nickel sulfate solution changes to blue nickel chelate compound reacting with EDTA. Aqueous solution of EDTA at 2a was colorless and transparent and the pigment composition of the aqueous solution of nickel sulfate at 2b was red: 15, green: 138 and blue: 107. The pigment composition of the subject liquid at the discharge zone showed the value of red: 16, green: 108 and blue: 183, which were discharged at the liquid channels 51a and 51b, i.e., the reaction had occurred by nickel sulfate diffusing to the EDTA side. The color change was measured by scanning the images of the subject liquids in the liquid channels with a digital camera (color) and then separating the images to 3 primary colors of RGB (red, green, blue) by using an image processing software ("PHOTOSHOP", Adobe Systems Incorporated).

Figure 10A:
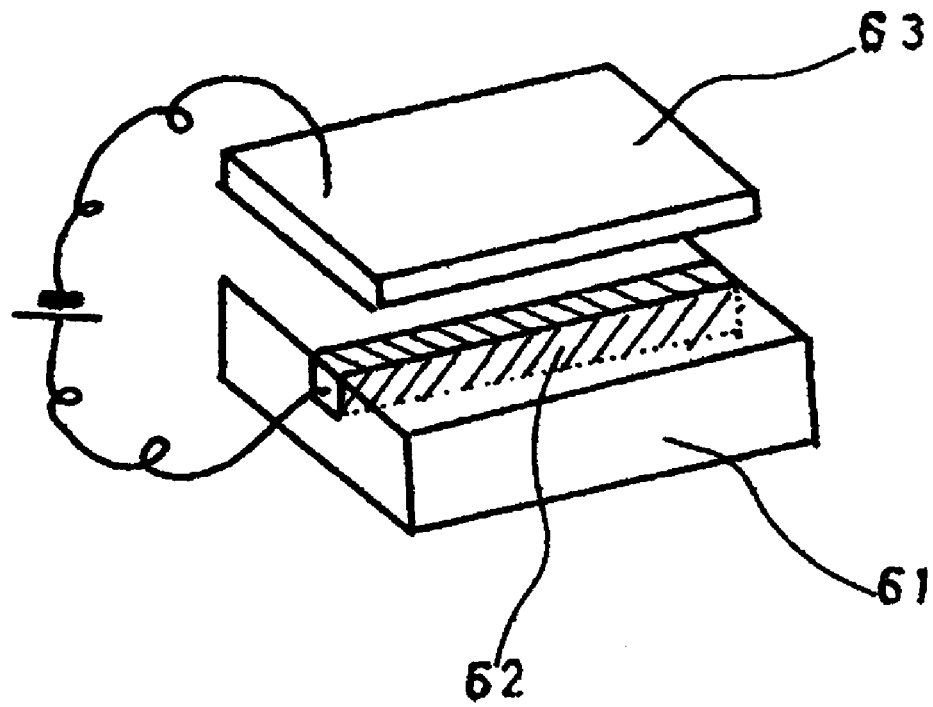
FIG. 10A is an outline of an apparatus applying a liquid channel of the invention for plating and FIG. 10B shows its operation status.
Figure 10B:
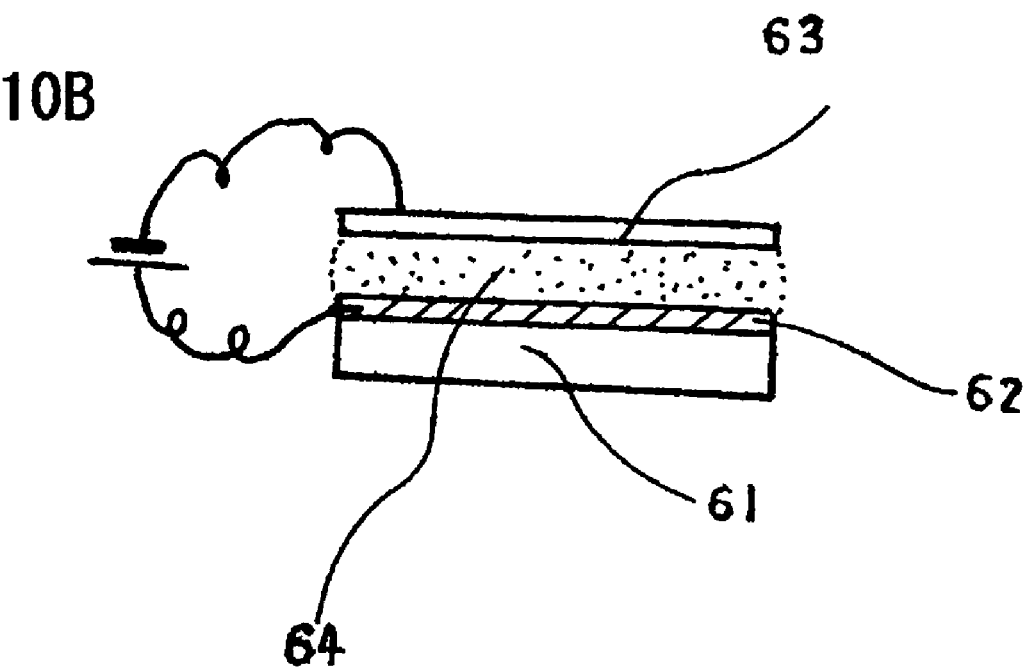

FIG. 10 represents an apparatus for plating with the liquid channel formed by the magnetic barriers. FIG. 10A shows only the liquid channel zone formed by a ferromagnetic track 62 (steel of 50 μm width), which is installed on a substrate 61 of acrylic resin, setting a 0.5 mm-thick spacer (not shown in the figure) on the substrate 61 and placing a 100 μm-thick platinum sheet 63 on it to form a liquid channel around the ferromagnetic track 62 and the platinum 63. In FIG. 10B, the operation of the plating is shown. Water was used for the surrounding liquid and 0.3 mol/dm$^3$ copper sulfate aqueous solution was used for the plating solution 64. Magnetic flux density of an external magnetic field was 0.8 T. The direct-current voltage of 1.5 V with 0.1 A was applied between the ferromagnetic track 62 and the platinum board 63. Then, the plating solution was flowed for 130 seconds under these conditions, so that a microscopic copper-plating line with 0.95 mm wide and 110 μm thick was formed on the platinum board 63. In addition, instead of this plating solution 64, using a liquid containing ferrite powder together with an acrylic board instead of the platinum sheet 63, a ferromagnetic track for the microreactor of the invention could be produced. By using a ferric chloride solution as a corrosive liquid instead of this plating solution 64 together with a copper-foiled substrate instead of the platinum sheet, microscopic line etching could be provided to the copper-foiled substrate, which could be used for the microreactor by the groove processing.

Figure 11:
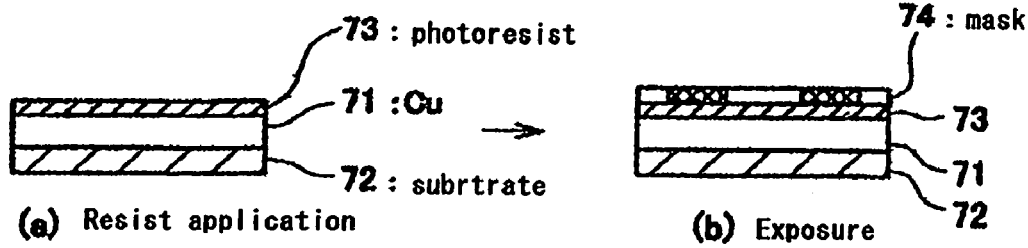
FIG. 11 shows schematic views of processes of subtract methods that are conventional plating methods.
Figure 11:
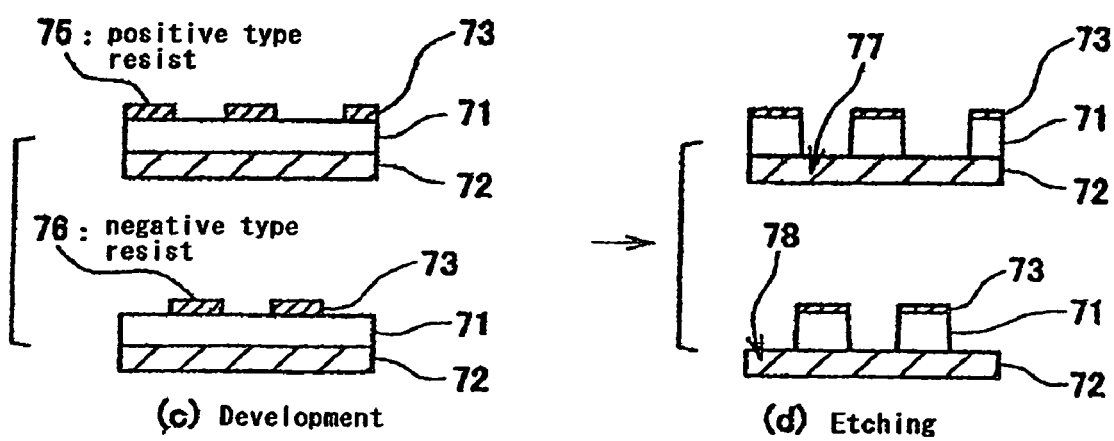
Figure 11:
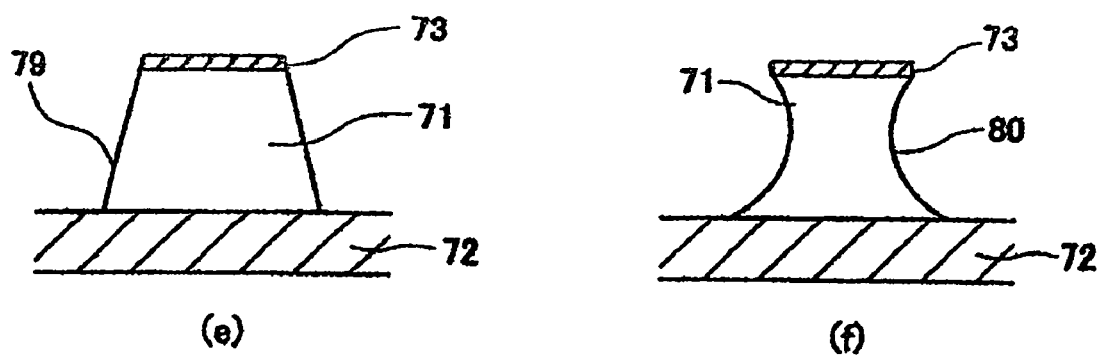

FIG. 11 shows the circuit-formation process by a subtract method, i.e., one of the conventional etching methods. After coating photosensitive resin called photoresist 73 on a substrate 72 covered with a copper foil 71, another film drawing a circuit pattern called photomask 74 is placed on it. Then, the exposure by the ultraviolet rays irradiated over it makes the photoresist 73 solidified and adhered to the substrate. By removing unnecessary portions of photoresist 73 with solvent, positive-type resist 75 or negative-type resist 76 is completed, i.e., removing the extra portions except for the circuit portion by the immersion of the positive-type resist 75 or negative-type resist 76 in etching solution, a positive-type circuit 77 or a negative-type circuit 78 of copper wiring is completed. As shown in a part of the fabricated circuit magnified in Figs. e and f, the subtract method, i.e., one of the conventional etching methods often produces cutting margins with irregular shapes such as over-etching 79 and underetching 80, so that there is the lower limit for decreasing a line width of circuits.

Figure 12:
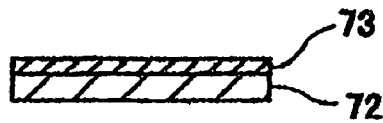
FIG. 12 shows schematic views of processes of additive methods that are conventional plating methods.
Figure 12:
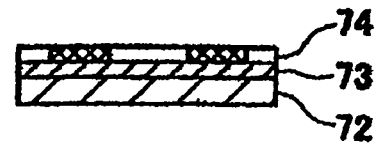
Figure 12:
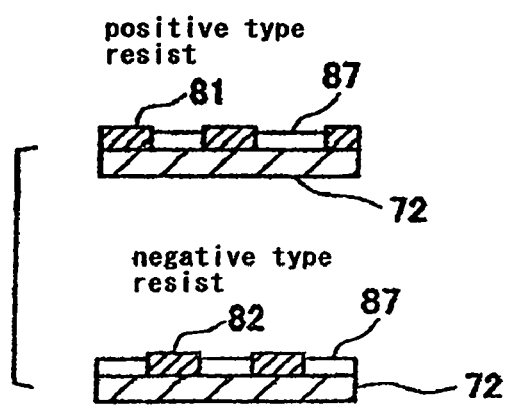
Figure 12:
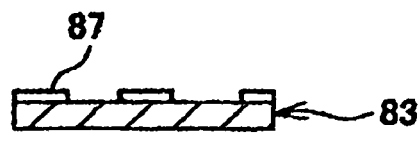
Figure 12:
Figure 12:
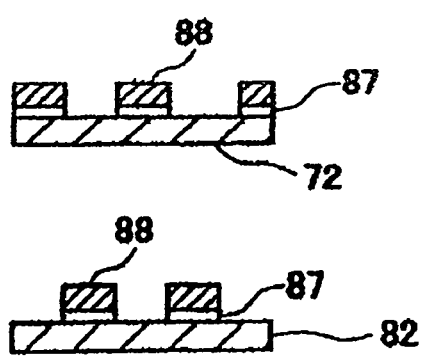
Figure 12:
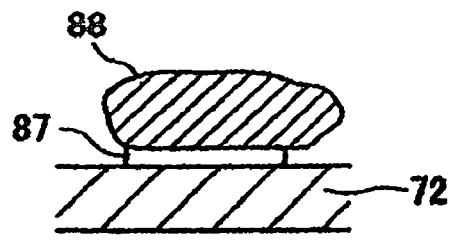

In FIG. 12, as the other example of the conventional plating, a circuit fabrication by the additive method is represented. After a substrate 72 is coated with photoresist, a photomask 74 is laminated on the photoresist. Then, exposing the laminated surface to ultraviolet rays, and removing unnecessary portions with solvent, positive-type resist 81 or negative-type resist 82 is produced. A positive-type conductive circuit 83 or a negative-type conductive circuit 84 is fabricated by performing electroless plating to the positive-type resist 81 or negative-type resist 82. Finally, copper is deposited on them by electroplating, so that a positive-type circuit 85 or a negative-type circuit 86 is produced. As shown in Fig. f, where a part of the produced circuit is magnified, the wiring consists of an electroplated portion 88 stacked on an electroless-plated portion 87. Though the additive method allows us to make narrower line widths than that of the subtract method, there is a problem that irregular deposits such as burrs tend to occur.

Figure 13:
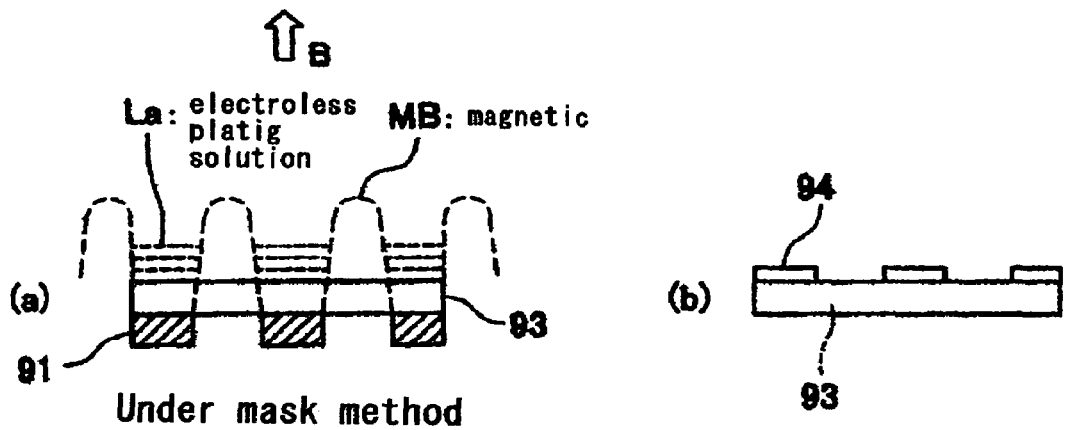
FIG. 13 shows outlines of processes of additive methods using magnetic barriers that are plating methods of the invention.
Figure 13:
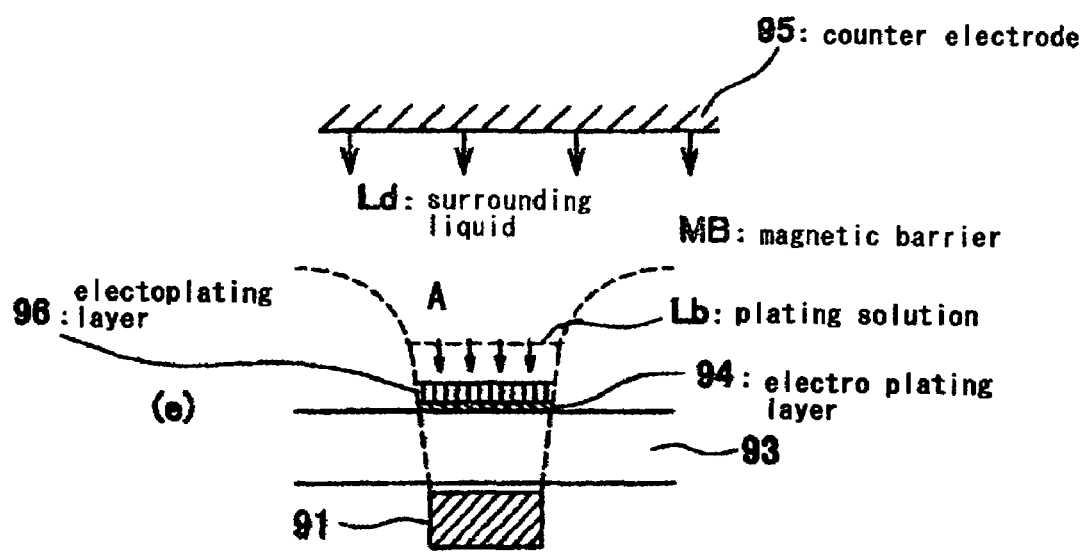

FIG. 13 shows a circuit wiring by means of an additive method using a kind of mask formed by the magnetic barriers of the invention. Magnetic barriers MB work as the magnetic mask, which are formed by ferromagnetic tracks 91 or 92 placed in a magnetic field B. Flowing electroless plating solutions La in a liquid channel formed by the magnetic barrier, an electroless plating layer 94 is deposited on a substrate 93. By passing an electroplating solution Lb in the same liquid channel, an electroplating layer 96 can be stacked on the electroless plating layer 94, where an electric current A flows between a substrate 93 and a counter electrode 95.

Figure 14:
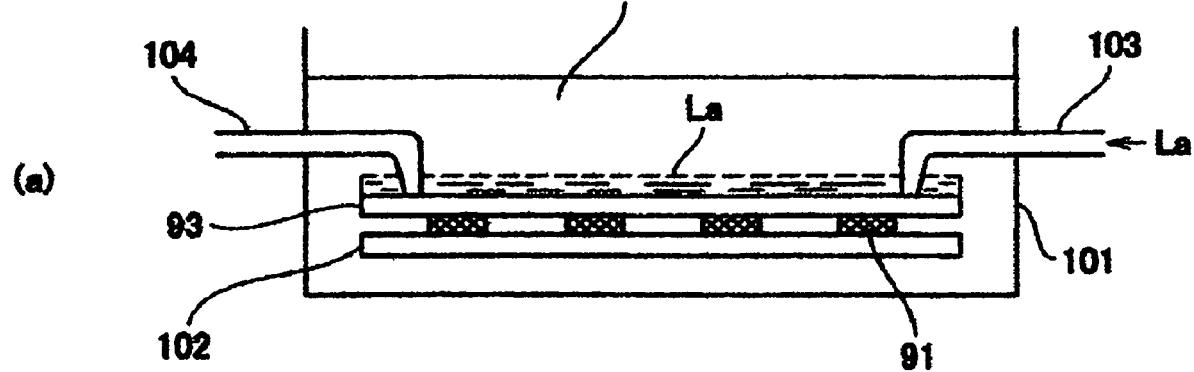
FIG. 14 shows a sectional view (a) of an apparatus to explain for more detail of electroless plating process of FIG. 13 and a perspective view (b) of components of the apparatus.
Figure 14:
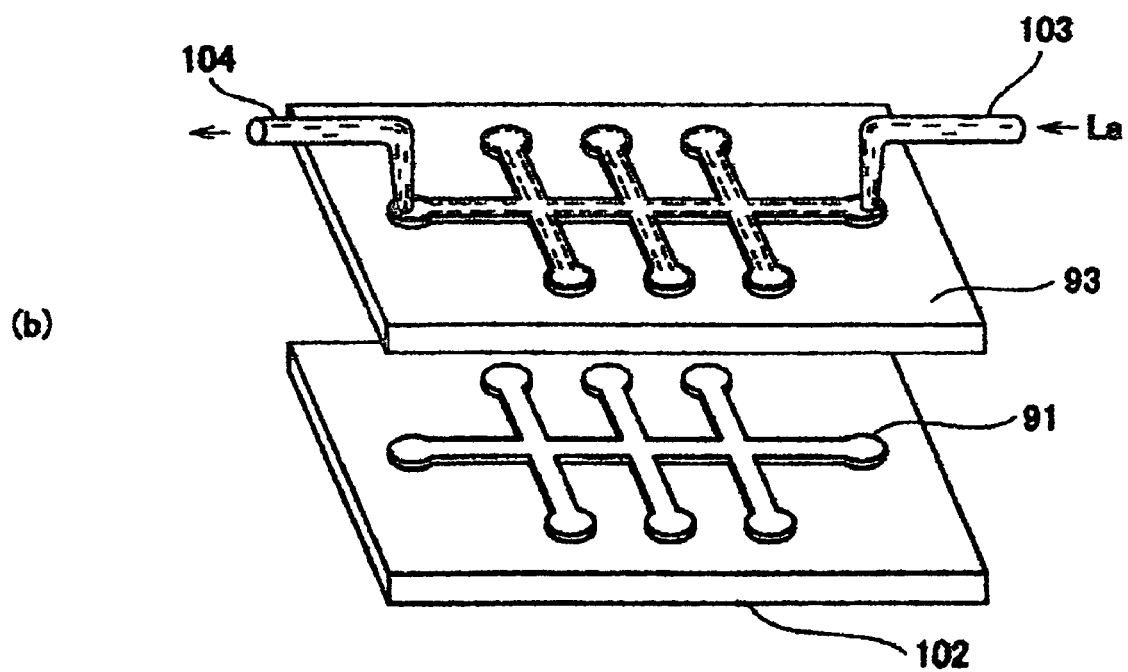

Since in FIG. 13, the role of surrounding liquid in electroless plating could not be shown, in FIG. 14, the role together with the process of electroless plating are precisely elucidated. Fig. A in FIG. 14 shows a cross section of an apparatus for electroless plating. In Fig. B, the perspective view for each component of the apparatus is presented. A vessel 101 is placed in a magnetic field B, where a ferromagnetic track 91 with a constant pattern is put on a pattern board 102. Then, an electroless-plating solution La flows in a liquid channel formed by the magnetic barriers of ferromagnetic tracks 91, where at either of inlet 103 or outlet 104, or at both, one or two pumps are settled to form an electroless-plating layer on a substrate 93, respectively. The flowing electroless-plating solution La is usually composed of a liquid of catalyst and a plating solution, whereas other spaces except for the liquid channel where the electroless-plating solution La flows are filled with a surrounding liquid Lc. Whatever surrounding liquid Lc is acceptable; in electroless plating, pure water is often used. In electroless plating, surrounding liquid not always assists fluent streaming of plating solution with decreasing surface tension of substrate but also adjusts the shape of the solution to the magnetic barriers. In high-temperature plating at 40° C. to 60° C., surrounding liquid Lc protects the oxidation of the plating solution, and promotes the quality of plating by keeping the plating temperature constant.

Figure 15:
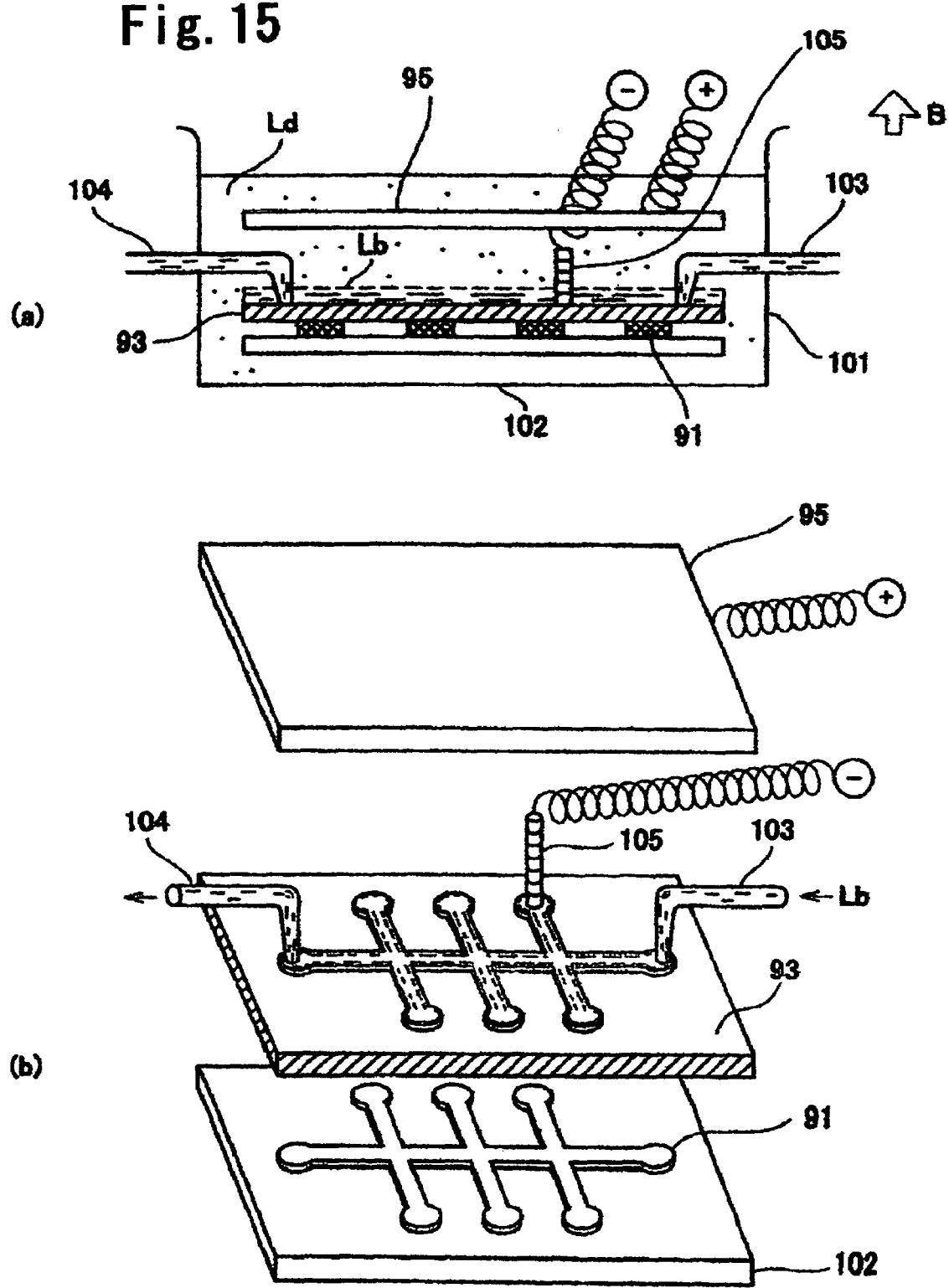
FIG. 15 shows a sectional view (a) of an apparatus to explain for more detail of an electroplating process of FIG. 13 and a perspective view (b) of components of the apparatus.

FIG. 15 shows an example of electroplating performed after the electroless plating elucidated in FIG. 14. Fig. A presents a cross section view of an electroplating apparatus and Fig. B shows a perspective view of the component parts. An electroplating layer deposits over an eletroless-plating layer on a substrate 93 in the following; an electroplating solution Lb first flows in a liquid channel arising from magnetic barriers, which are formed by ferromagnetic tracks 91 placed in a magnetic field B, and then a current flows between a counter electrode 95 on the upper side and an electrode 105 attached on the substrate 93. Other spaces except for the flowing electrolyte solution Lb in a vessel 101 are filled with a surrounding liquid Ld. The same supporting electrolyte (, e.g., sulfuric acid etc.) as that in the plating solution Lb is added to the surrounding liquid Ld, so that the counter electrode 95 can be set away from the substrate 93 (together with the electroless-plating layer and the electroplating layer), which is convenient for plating working. The surrounding liquid Ld, as mentioned in the surrounding liquid Lc of electroless plating, assists the fluent stream of the liquid on the substrates with decreasing the surface tension of the substrate. At the same time, the liquid adjusts the shape of the plating solution to the magnetic barriers, protecting the oxidation of plating solutions, and keeping the plating temperature constant.

Figure 16:
FIG. 16 shows a photograph indicating a plating pattern applying a plating method of the invention.

In FIG. 16, is shown a photograph of a plating pattern by the application of the plating method of the invention. After copper electroless-plating onto a substrate of platinum sheet (4×4 mm, 0.5 mm thick), copper electroplating produced a copper-plating pattern. A magnetic pattern for the magnetic mask was used, which had been used for the experiment of the magnetic channel shown in FIG. 7A. The whole pattern was wrapped by plastic films, and closely contacted with the lower side of the substrate. Vertical magnetic field was kept at 5 T. First, copper electroless plating was performed as follows; Solution A consisted of 2.5 wt % copper sulfate pentahydrate, 3.5 wt % sodium hydroxide of and 12.1 wt % Rochelle salt, and Solution B contained 10 wt % formally, both of which were just before experiment. Then, the mixed electroless-plating solution is injected from the upper side of the pattern at the rate of 0.1 mL/min with a syringe pump, being drenched from the lower side at the same rate. Solution temperature of the electroless plating solution was kept at 40° C., and pure water was used for the surrounding liquid. After the electroless plating, the electroplating was carried out as follows; The plating solution consisted of 0.3 mol/dm$^3$ copper sulfate and 1 mol/dm$^3$ sulfuric acid solution, and the surrounding solution was 1 mol/dm$^3$ sulfuric acid solution. Plating was performed at room temperature. The flow rate of plating solution given by the syringe pump was the same as that in the electroless plating. A copper sheet with the same dimension as the substrate was used for the counter electrode, which was placed at the interval of 1 mm, parallel to the substrate. Then, the overvoltage of −0.5 V was imposed to the substrate against the counter electrode for 10 min. These operations led to a plating pattern shown by the photograph in FIG. 16.

6. INDUSTRIAL APPLICABILITY

The invention is useful for microreactor with superb reaction efficiency since in spite of microscopic liquid channel, the viscous resistance from wall is low, and the mixing efficiency is high. Furthermore, this invention is useful for the applications such as plating onto microscopic and complicated places in shape and etching for microscopic and complicated patterns.

The invention claimed is:

1. A microreactor, comprising:
   substrate;
   a ferromagnetic track arranged on or embedded inside the substrate;
   a liquid introduction zone,
   a microscopic liquid channel disposed on the substrate, the liquid channel being formed by a magnetic barrier which is generated by the ferromagnetic track and by applying a magnetic field, the liquid channel being adapted to pass a liquid having magnetism introduced from the introduction zone;
   a liquid discharge zone for discharging the liquid; and
   an apparatus for applying an external magnetic field to the ferromagnetic track or magnetism being maintained by the ferromagnetic track itself.

2. A microreactor according to claim 1, wherein the liquid discharge zone is expanded in a forward direction or branched to more than one zone.

3. A microreactor according to claim 1, wherein microscopic liquid channels are installed in plural and parallel.

4. A microreactor according to claim 1, wherein the microscopic liquid channel is branched.

5. A microreactor, comprising:
   a liquid introduction zone;
   a microscopic liquid channel, said liquid channel being formed by a magnetic barrier created at least in part by operation of a ferromagnetic track, said liquid channel being operable for performing at least one of chemical reaction, mixing, extraction and absorption in the liquid channel, an outside of the liquid channel which is formed by the magnetic barrier being filled with surrounding fluid; and
   a liquid discharge zone.

6. A microreactor according to claim 5, wherein said surrounding fluid is operable for performing at least one of reaction, extraction or absorption with liquid flowing in the liquid channel formed by the magnetic barrier.

7. A method of manufacturing a plated object, comprising: which comprises
   bringing into contact with a solid, an outside of a liquid channel formed by a magnetic barrier which is generated by a ferromagnetic track arranged on or embedded inside a substrate and by applying magnetic field; and
   plating a pattern along the liquid channel to the solid by a magnetic plating solution introduced from an introduction zone and flowing in the liquid channel.

8. A method according to claim 7, wherein said plating includes:
   forming an electroless plating layer on the solid by flowing electroless plating solution in the liquid channel formed by the magnetic barrier; and
   electroplating the electroless plating layer formed by the electroless plating by flowing electroplating solution in the liquid channel.

9. A method of manufacturing a plated object, comprising:
   bringing into contact with a solid, an outside of a liquid channel formed by a magnetic barrier; and
   plating a pattern along the liquid channel to the solid by a magnetic plating solution flowing in the liquid channel, said plating including electroless plating and electroplating, said electroless plating and said electroplating includes filling the outside of a place flowing plating solution with surrounding liquid.

10. A method of manufacturing an etched object, comprising:
    bringing into contact with a solid, an outside of a liquid channel formed by a magnetic barrier which is generated by a ferromagnetic track arranged on or embedded inside a substrate and by applying magnetic field; and
    etching a pattern along the liquid channel to the solid by corrosive reaction or electrolysis of a magnetic liquid introduced from a liquid introduction zone and flowing in the liquid channel.

* * * * *